June 23, 1964   K. VON BRUNOWSKY   3,138,058
IMAGE VIEWER

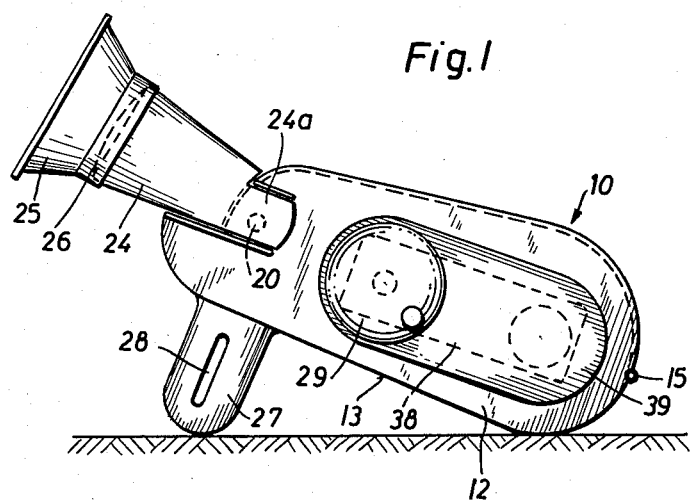
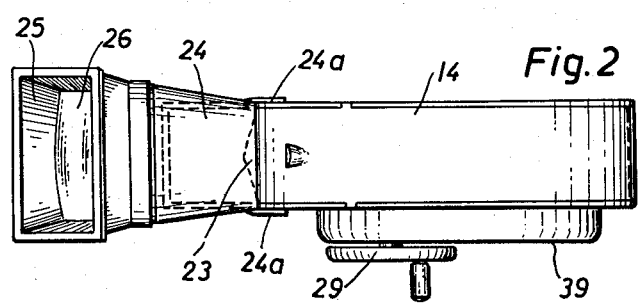
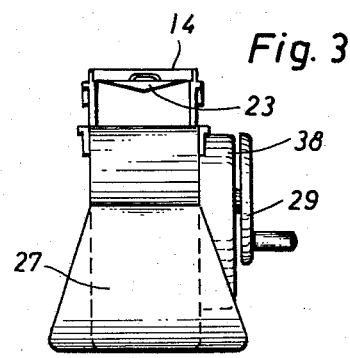

Filed March 2, 1961   3 Sheets-Sheet 2

INVENTOR
Karl von Brunowsky
BY
ATTYS.

June 23, 1964  K. VON BRUNOWSKY  3,138,058
IMAGE VIEWER

Filed March 2, 1961  3 Sheets-Sheet 3

INVENTOR
Karl von Brunowsky
BY
Lowry & Rinehart
ATTYS.

United States Patent Office 3,138,058
Patented June 23, 1964

3,138,058
IMAGE VIEWER
Karl von Brunowsky, 99a Moltkestrasse,
Cologne, Germany
Filed Mar. 2, 1961, Ser. No. 92,853
Claims priority, application Germany Mar. 5, 1960
4 Claims. (Cl. 88—19)

This invention relates to an image viewer in the form of home motion pictures with an image sequence moving in front of a viewing aperture.

There is available home motion picture projection apparatus which corresponds to theater projection apparatus. In this connection, a film is used on which the separate photographic film images are arranged in sequence. The film is wound from one spool to another, the film being led past an optical lighting system, and the image being projected onto a screen. These projectors are comparatively complicated and costly. There is also a child's home motion picture viewer generally known as a roundabout. In this arrangement, separate pictures, often in the form of transparencies, are arranged on the circumference of a rotatable vertical drum, the pictures differing as regards the phases of movement of the persons who are represented. The cylinder is moved past a viewing aperture. If the cylinder is rotated at sufficient speed, the viewer is given the impression of a motion film.

The invention is concerned with a further development of an image viewer serving as a home motion picture viewer. It is characterized in that the image sequence of the projector portion consists of a plurality of resilient sheets, foils or the like made of paper, synthetic resin or the like, which are arranged in close juxtaposition and are provided with separate pictures, the sheets or the like being fixed at the lower edges thereof to a common flexible supporting band. The housing of the device comprises a revolving endless conveyor device, preferably a conveyor band, on which the supporting band provided with the series-arranged sheets or foils is adapted to be suspended. The viewing aperture arranged on the housing is provided with a projection extending into the aperture cross-section, on which projection that free edge of the sheet opposite to the viewing edge of the latter is adapted to strike before being reversed. The sheets connected to the supporting band can be illustrated in the desired manner. The representations on the successive sheets or leaves should differ slightly from one another as regards the phases of movement.

In this manner, the rapidly succeeding reversal of the leaves at the viewing aperture gives the impression of a motion film. The viewer is given the impression of a moving scene. There is thus provided an image viewer with which, by slow movement of the "caterpillar" of leaves on the supporting band, the separate leaves are successively changed in rapid sequence at the aperture and thereby simulate a moving picture. The image viewer according to the invention is simple in design and easy to manipulate. The viewer can be adjusted for the image sequence to move at a faster or slower speed. The movement of the caterpillar of leaves can be stopped at any position, so that any separate image or picture can be individually viewed in comfort. The image viewer according to the invention is intended mainly as a toy for young and older children. The children may perhaps be encouraged to color the leaves provided with tracings or even to prepare themselves a caterpillar of leaves with their own image sequence. The device itself is easy to handle and does not require any expensive optical components. It can be used as a viewer without assistance of an optical lens, although it is also possible for a simple optical lens to be fitted in front of the viewing aperture. The device according to the invention can also be used as an advertising article.

In order to drive the caterpillar of leaves on the supporting band by the conveyor band in the housing, the former band can be provided with a hook. The conveyor band is preferably formed as a chain, in which the hook of the carrier band can be hooked at any desired position. The caterpillar is preferably inserted into the housing from above. For this purpose, the housing cover is advantageously arranged to uncover the entire length of the housing, being for example hinged thereon. The cover can likewise extend as far as the cross-section of the viewing aperture and comprise at the forward end the projection or nose on which the leaves of the image sequence successively rebound during the forward movement of the caterpillar.

A funnel-like member, preferably of transparent material, can be arranged to be fitted before the viewing aperture, with the funnel also serving as a support for a supplementary lens. The device according to the invention can also be arranged in conjunction with a conventional episcope. The base plate of the episcope is preferably formed with a recess into which can be fitted the base of the viewer with the said base serving as a handle. In this way, the position of the viewer relative to the episcope is established.

Several embodiments of the invention are shown by way of example in the drawings, in which:

FIGS. 1, 2 and 3 show the viewer according to the invention in side elevation, top plan view and front elevation, respectively;

Figure 4:
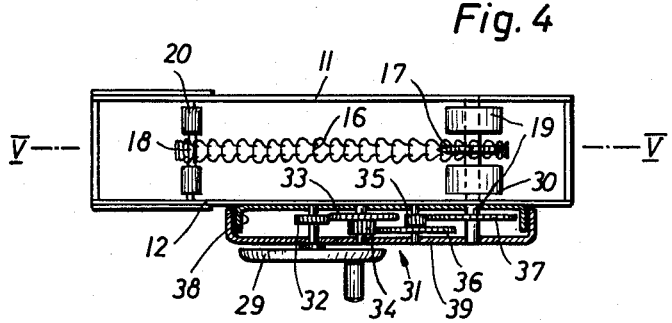
FIG. 4 is a view looking into the device from above with the cover removed and partly in section.

The viewer according to the invention comprises a housing 10 made of sheet metal, synthetic resin or the like which is preferably of an elongated form and consists of side walls 11 and 12, a base 13 and a cover 14. This cover is hingedly mounted and is pivoted at 15 to the side walls 11 and 12. Arranged inside the housing is a conveyor device, which preferably consists of an endless chain 16, that is guided around a sprocket wheel 17 and a front reversal shaft 18. Arranged laterally of the sprocket wheel 17 on the shaft 30 carrying the sprocket wheel 17 are spaced guide rollers 19 of comparatively large diameter, while the shaft 18 carries spaced front guide rollers 20 of substantially smaller diameter than the rollers 19. The housing is formed at the forward end with a cut-out 21, defining a viewing aperture 22. Projecting into the upper part of the aperture 22 is a projection or nose 23, which is preferably carried by the cover 14. A viewing funnel or hood can be fitted in front of the aperture 22, the hood in the example illustrated consisting of the parts 24 and 25. The hood part 24 embraces the housing walls 11 and 12 by means of lugs 24ª and preferably consists of a translucent material, more especially synthetic resin. Between the outer hood part 25 and the other part 24, it is possible to fit an optical lens 26. In order that the viewing aperture 22 is arranged to extend obliquely upwards, the housing 10 is provided with a foot or base 27. This foot 27 can be in the form of a closed container and serve as a money box, for which purpose a slot 28 is provided on one side for the insertion of coins. The money box encourages the child and perhaps also the adults to whom a show is offered by the child to collect money for the purchase of another image sequence.

The conveyor band 16 can be driven in any desired manner and advantageously a crank mechanism is provided. The shaft 30 carrying the sprocket wheel 17 is driven from a hand crank 29 through a toothed wheel gearing 31. The latter can consists of the toothed wheels 32–37, the shafts of which are mounted in the housing 38 which can form an independent unit. The gear housing 38 can be covered by an attachment 39. The gearing shown in the example can also be replaced by any other gearing.

Figure 5:
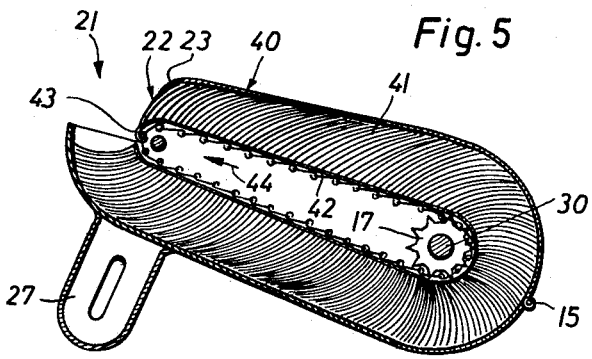
FIG. 5 illustrates the viewer in longitudinal section on the line V—V of FIG. 4, with the "caterpillar" fitted.

The image sequence used in the viewer according to the invention consists of a caterpillar 40, which is formed from a plurality of leaves or foils 21 which are arranged in succession in the same plane, these leaves being mounted on and connected to a common supporting band 42 at their bottom edges. The band is flexible and preferably consists of a stiff linen. Disposed at the forward end of the carrier band is a hook 43, by which the band and thus the caterpillar 40 can be hooked in any desired link of the conveyor chain 16. The leaves, which can consist of paper, foil or suitable synthetic resin, are provided on their front sides with representations of pictures or texts in a sequence similar to cinematographic exposures. The pictures can be printed or drawn and it is also possible directly to employ photographs. The caterpillar is so placed around the conveyor chain 16 that the corresponding space in the housing is completely filled, as will be seen from FIG. 5. For this purpose, the hook 43 is hooked into one link of the chain, so that by rotation of the sprocket wheel 17, the caterpillar is moved in counterclockwise direction in FIG. 5.

In order that each separate leaf appears at the viewing aperture 22 as the caterpillar moves past the same and in order that the leaves do not stick together, the nose 23 projects into the viewing aperture. By means of this nose 23, the succeeding group of leaves is also somewhat compressed immediately before the aperture 22, so that the leaves in front of the nose are somewhat tensioned opposite to the direction of movement. After each separate leaf is freed by the nose, the leaf turns over with all the more force, due to the strong retaining action. Furthermore, because of the small diameter of the front guide rollers 20, the leaves which are to be turned or flicked over are already so far reversed that the free viewing angle between the last sheet to be flicked over and the one following it and still retained by the nose or projection corresponds approximately to the cut-out 21 in the front housing part. In this way, the surface of the sheet is fully visible at the aperture 22.

The enlarging lens 26 can be arranged to be displaceable as regards the spacing of the lens from the picture to be viewed, whereby sharp focusing is possible for each eye. The lens is preferably made sufficiently wide of the picture to be observed with both eyes.

Figure 6:
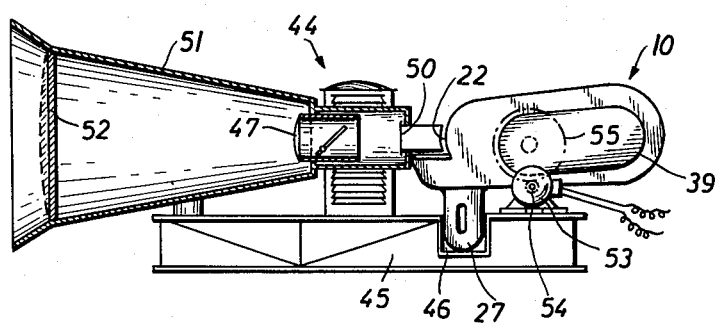
FIGS. 6 and 7 are respectively a side elevation and a top plan view, partly in section, showing the combination of the viewer according to the invention with an episcope.
Figure 7:
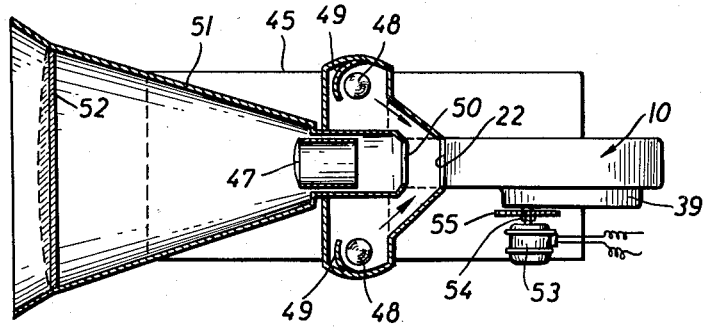

FIGS. 6 and 7 show the viewer 10 according to the invention combined with an episcope 44. The episcope 44 comprises a base plate 45 in which is formed a recess 46 into which the foot 27 of the housing can be fitted. By this means, the viewer 10 is given the correct position in relation to the episcope. The episcope 44 includes an adjustable lens 47. Located at the sides of the lens 47 are the light sources 48 with a reflector 49 directed towards the aperture 22. Spaced from the aperture 22 is a cut-out 50 for defining the image field. Arranged in front of the lens is a hood 51, which carries at its front end a ground glass screen 52 onto which the picture is projected. The ground glass screen can be curved and be arranged to be removable. The caterpillar in the housing 10 can be driven electrically, for example, by means of the electric motor 53 which is arranged on the base plate 45, the gear 54 on the driving shaft of the motor meshing with the gear 55 of the gearing 31.

I claim:

1. An image viewer comprising a housing having a viewing opening, spaced guide rollers in the housing, an endless belt passing over the guide rollers and driven thereby, a carrier band having means at one end for attachment to the belt and a plurality of picture elements secured at one edge to said band and projecting therefrom for sequential positioning in alignment with the viewing opening, the endless belt comprising a link chain and the attaching means on the carrier band being a hook member selectively engageable with a link of the chain.

2. An image viewer comprising a housing having a viewing opening, spaced guide rollers in the housing, an endless belt passing over the guide rollers and driven thereby, a carrier band having means at one end for attachment to the belt and a plurality of picture elements secured at one edge to said band and projecting therefrom for sequential positioning in alignment with the viewing opening, the endless belt comprising a link chain and the attaching means on the carrier band being a hook member selectively engageable with a link of the chain, the upper end of the viewing opening being formed with a nose on the housing for contact by the free outer ends of the picture elements to impart snap movement thereto.

3. An image viewer comprising a housing having a viewing opening, spaced guide rollers in the housing, an endless belt passing over the guide rollers and driven thereby, a carrier band having means at one end for attachment to the belt and a plurality of picture elements secured at one edge to said band and projecting therefrom for sequential positioning in alignment with the viewing opening, the endless belt comprising a link chain and the attaching means on the carrier band being a hook member selectively engageable with a link of the chain, the upper end of the viewing opening being formed with a nose on the housing for contact by the free outer ends of the picture elements to impart snap movement thereto, a detachable viewing hood mounted on the housing outwardly of the viewing opening and an adjustable lens in the viewing hood.

4. An image viewer comprising a housing having a viewing opening, spaced guide rollers in the housing, an endless belt passing over the guide rollers and driven thereby, a carrier band having means at one end for attachment to the belt and a plurality of picture elements secured at one edge to said band and projecting therefrom for sequential positioning in alignment with the viewing opening, the endless belt comprising a link chain and the attaching means on the carrier band being a hook member selectively engageable with a link of the chain, the upper end of the viewing opening being formed with a nose on the housing for contact by the free outer ends of the picture elements to impart snap movement thereto, a foot element depending from one end of the housing, an episcope upon which the housing is mounted, and a base plate for the episcope having a recess in its upper side and said foot element of the housing being mounted in said recess.

References Cited in the file of this patent

UNITED STATES PATENTS

| | | |
|---|---|---|
| 617,643 | Davis | Jan. 10, 1899 |
| 667,635 | Simpson | Feb. 5, 1901 |
| 722,393 | Warren | Mar. 10, 1903 |
| 865,593 | Jenkins | Sept. 10, 1907 |
| 1,256,604 | Spear | Feb. 19, 1918 |
| 2,258,722 | Saunders | Oct. 14, 1941 |